(12) United States Patent
Knapp et al.

(10) Patent No.: US 6,229,434 B1
(45) Date of Patent: May 8, 2001

(54) VEHICLE COMMUNICATION SYSTEM

(75) Inventors: Robert C. Knapp, Coloma; Robert R. Turnbull, Holland; Eric J. Walstra, Grand Rapids, all of MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

(21) Appl. No.: 09/368,325

(22) Filed: Aug. 3, 1999

Related U.S. Application Data

(63) Continuation-in-part of application No. 09/262,651, filed on Mar. 4, 1999.

(51) Int. Cl.$^7$ .............................. H04B 1/00; B60Q 1/00
(52) U.S. Cl. ................... 340/310.01; 340/425.5; 340/310.06; 340/825.05; 340/825.72; 701/49; 307/10.1
(58) Field of Search ............... 340/310.01, 310.06, 340/310.02, 425.5, 825.06, 825.07, 825.69, 825.72; 701/36, 49, 53; 301/10.1

(56) References Cited

U.S. PATENT DOCUMENTS

| | | | |
|---|---|---|---|
| 4,907,222 | * | 3/1990 | Slavik ................... 307/10.1 |
| 4,926,158 | * | 5/1990 | Zeigler ................... 340/538 |
| 5,504,478 | | 4/1996 | Knapp ................... 307/10.1 |
| 5,798,575 | * | 8/1998 | O'Farrell et al. ................... 307/10.1 |
| 5,821,632 | * | 10/1999 | Normann et al. ................... 307/10.1 |
| 5,956,012 | | 9/1999 | Turnbull et al. ................... 345/105 |
| 5,959,367 | | 9/1999 | O'Farfell et al. ................... 307/10.1 |
| 6,006,143 | * | 12/1999 | Bartel et al. ................... 701/36 |
| 6,056,410 | | 5/2000 | Hoekstra et al. ................... 359/608 |
| 6,064,299 | * | 5/2000 | Lesesky et al. ................... 340/825.69 |

OTHER PUBLICATIONS

Intellon, News Release, "Intellon Corporation Announces Registration to ISO 90001:1994", May 12, 19999.
Intellon, White Paper #0032, "OFDM Communications Primer", Mar. 1999.
Intellon, "Intellon High Speed Power Line Communications", Mar. 1999.
PLC Trucks web site, "SAE J1587 Networking Using Spread Spectrum Power Line Communications (PLC) over the DC Power Bus", Jul. 2, 1999.

* cited by examiner

Primary Examiner—Donnie L. Crosland
(74) Attorney, Agent, or Firm—Price, Heneveld, Cooper, DeWitt & Litton; Brian Rees

(57) ABSTRACT

A communication circuit for use in a vehicle including a first electronic module adapted to be coupled to a power supply of the vehicle, a second electronic module, and an electrical conductor coupled between the first and second modules to provide a transmission path through which power may be supplied and through which bidirectional serial communication is enabled. The first module supplies power to the second module through the electrical conductor. The first and second modules transmit serial data to one another through the electrical conductor. The first and second modules may also transmit RF signals over the electrical conductor. The second module may be housed in an outside rearview mirror assembly while the first module may be disposed inside of the vehicle. Such a communication system allows independent control of multiple electrical components in the outside rearview mirror assembly over a single wire.

59 Claims, 6 Drawing Sheets

VEHICLE COMMUNICATION SYSTEM

CROSS-REFERENCE TO RELATED APPLICATIONS

This application is a continuation-in-part of U.S. patent application Ser. No. 09/262,651, filed on Mar. 4, 1999, and now pending. The entire disclosure of U.S. patent application Ser. No. 09/262,651 is incorporated herein by reference.

BACKGROUND OF THE INVENTION

The present invention relates to intra-vehicular communication systems, and more particularly, to arrangements for communicating data and supplying power through the same interface in a vehicle.

Demands for communication systems within vehicles have increased with greater use of electronic modules for a multitude of functions. Moreover, the increasing demand for data transmission within a vehicle creates a problem for managing wiring among functional modules. For example, many wires are typically needed to accommodate the power and communication requirements of an internal controller, an outside mirror position switch in a door panel, and the outside mirror itself. This is especially so if the outside mirror assembly includes several electrical components having differing functions, such as turn signal indicators, mirror positioners, an electrochromic mirror, RF antennas, a glass heater, security lights, and road/lane edge location sensors. If an outside mirror assembly included all these components and also included a mirror position memory feature, as many as 20 wires may be required to be run to the outside mirror. Good wire management suggests that it is desirable to reduce as much as possible the number of wires that must be run to the outside mirror assembly and to other electronic modules in the vehicle as well.

To reduce some of the wiring required for much of the electronic modules in an automobile, many automobiles have a dedicated bus for electrical signals related to the power train, and in addition, have at least one CAN or J1850 type system bus for other power demands within the vehicle such as locks, windows, HVAC, and the like. With such bus communication systems, however, each electronic module separately receives power from a power supply of the vehicle, such as the vehicle battery or ignition. Thus, in addition to the bus wiring, separate wiring must be run to each module and electrical component to provide power.

While replacing discrete wiring systems with bus systems has significantly reduced vehicle manufacturing and material costs, there are some situations in which it has generally not been desirable to replace discrete wiring with a connection to the CAN or J1850 vehicle system bus. For example, running the vehicle system bus to the exterior of the vehicle for connection to an outside mirror assembly or to any other electronic module outside the vehicle may compromise vehicle security. More specifically, commands to unlock the vehicle doors and deactivate the vehicle alarm system are typically transmitted over the vehicle system bus. If this bus were run to an electronic module outside the vehicle, a thief could readily gain access to the bus and transmit a command on the bus causing the doors to unlock and the alarm to deactivate. For this reason alone, manufacturers have not connected the electronic module in an outside rearview mirror assembly to a bus, but instead have used a significant number of discrete wires to enable independent control of all the functional components in the assembly.

It is known to use ordinary residential power lines to transmit data in a building. Such communication is affected by superimposing data signals on a power line using orthogonal frequency division multiplexing to accommodate noise and other interference in the power line. It is further known to apply this technology to data transmission in a tractor-trailer combination over the existing DC power bus in order to avoid extra wires beyond the standard SAE J560 connector. This data transmission technique, however, does not address the situation often found in automobiles where there is insufficient bandwidth to carry both power and data simultaneously or where using the vehicle bus would compromise security as in communication with an outside mirror. Also, if such a data transmission technique were used in an automobile, the resultant system would produce unacceptable levels of electromagnetic interference (EMI) since the data signals would be transmitted through the unshielded power wiring that runs through most of the vehicle. There remains a need for a bi-directional communication system, especially between the inside of the vehicle and the outside of the vehicle, which will accommodate a solution to the foregoing problems.

An additional problem caused by increasing vehicle complexity arises from the use vehicular windows, which incorporate low-E metallic coatings in order to reduce solar heating inside vehicles. While this feature has been effective in solar control, it has the unfortunate side effect of RF shielding the interior of the vehicle. As a result, the effectiveness of RF-based systems where the antenna is located in the interior of the vehicle, such as remote keyless entry, garage door openers, and tire pressure monitoring systems, is reduced.

SUMMARY OF THE INVENTION

One aspect of the present invention is directed to an arrangement for communicating between at least two modules mounted to a vehicle. A power conductor associated with one of the modules delivers electrical power between them, with one of them being dependent upon the other for power. In a preferred embodiment, the second module is an outside mirror module. A control arrangement, responsive to the first module (which can be an inside mirror module), selectively modulates an amount of electrical power delivered. In this manner, information may be transmitted through the power conductor between the first and second modules.

According to another embodiment, the communication circuit comprises: an RF antenna disposed outside of the vehicle, a first electronic module disposed inside the vehicle and coupled to a power supply of the vehicle, a second electronic module coupled to the RF antenna, and a dedicated electrical conductor coupled between the first and second modules to provide a transmission path through which power and RF signals may be transmitted. The first module supplies power to the second module through the dedicated electrical conductor and at least one of the first and second modules transmits RF signals to the other module through the dedicated electrical conductor.

According to yet another embodiment of the present invention, an outside rearview mirror assembly is provided that comprises a housing, and at least two electrical components disposed within or on the housing, the electrical components are coupled to an electrical conductor that provides a transmission path through which serial data signals may be collectively transmitted to the electrical components. The electrical components are independently controlled as a result of the transmittal of selected serial data signals transmitted through the transmission path.

These and other features, advantages, and objects of the present invention will be further understood and appreciated by those skilled in the art by reference to the following specification, claims, and appended drawings.

DETAILED DESCRIPTION OF THE PREFERRED EMBODIMENTS

Figure 1:
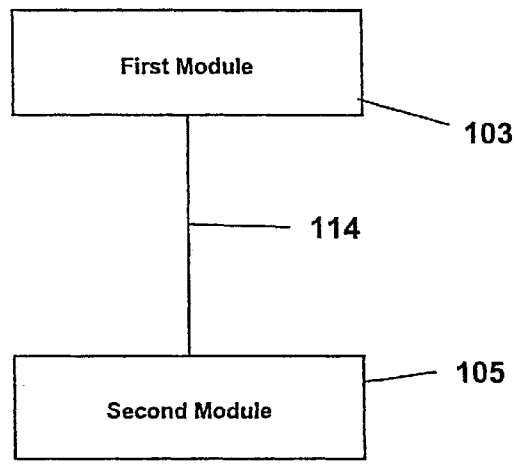
FIG. 1 is a block diagram illustrating the generic components of a vehicle communication system according to the invention.

The present invention is applicable to a variety of systems and arrangements where two modules in a vehicle are connected for communication by an interface and both power and data are to be transmitted between them. It has particular relevance where a vehicle incorporates outside elements, such as electrochromic mirrors, as transmitting and receiving antennas for simultaneous RF transmission. The invention has also been found to be advantageous for use in environments in which an automobile interior is RF shielded from the outside environment. Yet further, the invention meets the need where wire management demands in a vehicle require minimal wiring for transmission of data and power among intra-vehicle locations.

According to one aspect of the present invention, power and bi-directional data communication are provided over a single wire and ground pair to a module located outside the vehicle, such as an outside mirror. In addition to power and bi-directional serial data, bi-directional RF signals (if coaxial cable or other RF cable is used) may be simultaneously sent over the same wire.

According to one embodiment of the present invention, a transmitter and power supply are located in the inside rearview mirror housing (or any other convenient location within the vehicle interior such as a door or roof module). It will be understood that "inside the vehicle" or the vehicle interior includes any location within the principal exterior shell of the vehicle, such as a passenger compartment, a trunk, an engine compartment, and the inside of a door or other exterior panel. Conversely, "outside the vehicle" or the vehicle exterior includes any location outside the principal exterior shell, such as outside mirrors, antennas, attachments, bumpers, grills, spoilers, and the like. In the present embodiment, a microprocessor in the inside mirror modulates power to the outside mirror briefly to transmit data. When the power to the outside mirror is modulated, a capacitor in the outside mirror provides needed power. In one embodiment, the power supply modulates between two levels, e.g., 6 V and 8 V, to provide data communication while maintaining a continuous supply of power to the outside mirror module. Any additional power needed by the outside mirror can be supplied by the capacitor. This power supply and data transmission circuit also provides suppression of transient voltages present in automotive power systems, reducing the size and weight of the outside mirror electronics by eliminating the need for redundant protection circuitry.

In a first embodiment, transmission of data to the inside mirror is accomplished by means of a current loop. A current source in the outside mirror modulates the supply current drawn by the outside mirror module. Data is detected by a current sense amplifier in the inside mirror. Depending upon the modulation method that is chosen for the transmissions to and from the inside mirror, simultaneous bi-directional communication is possible.

Referring now to the drawings, FIG. 1 illustrates in block form basic components common to some of the embodiments of the invention. A first module 103 is connected to a second module 105 by an interface consisting of an electrical conductor 114. Power is supplied over electrical conductor 114 between the first and second modules, and during periods when the power is modulated, data is transmitted over the same conductor 114. Any of a number of well-known coding schemes for data transmission can be employed. For example, PWM, frequency modulation, or asynchronous serial data transmission can be used for data transmission as the power is modulated.

Figure 2:
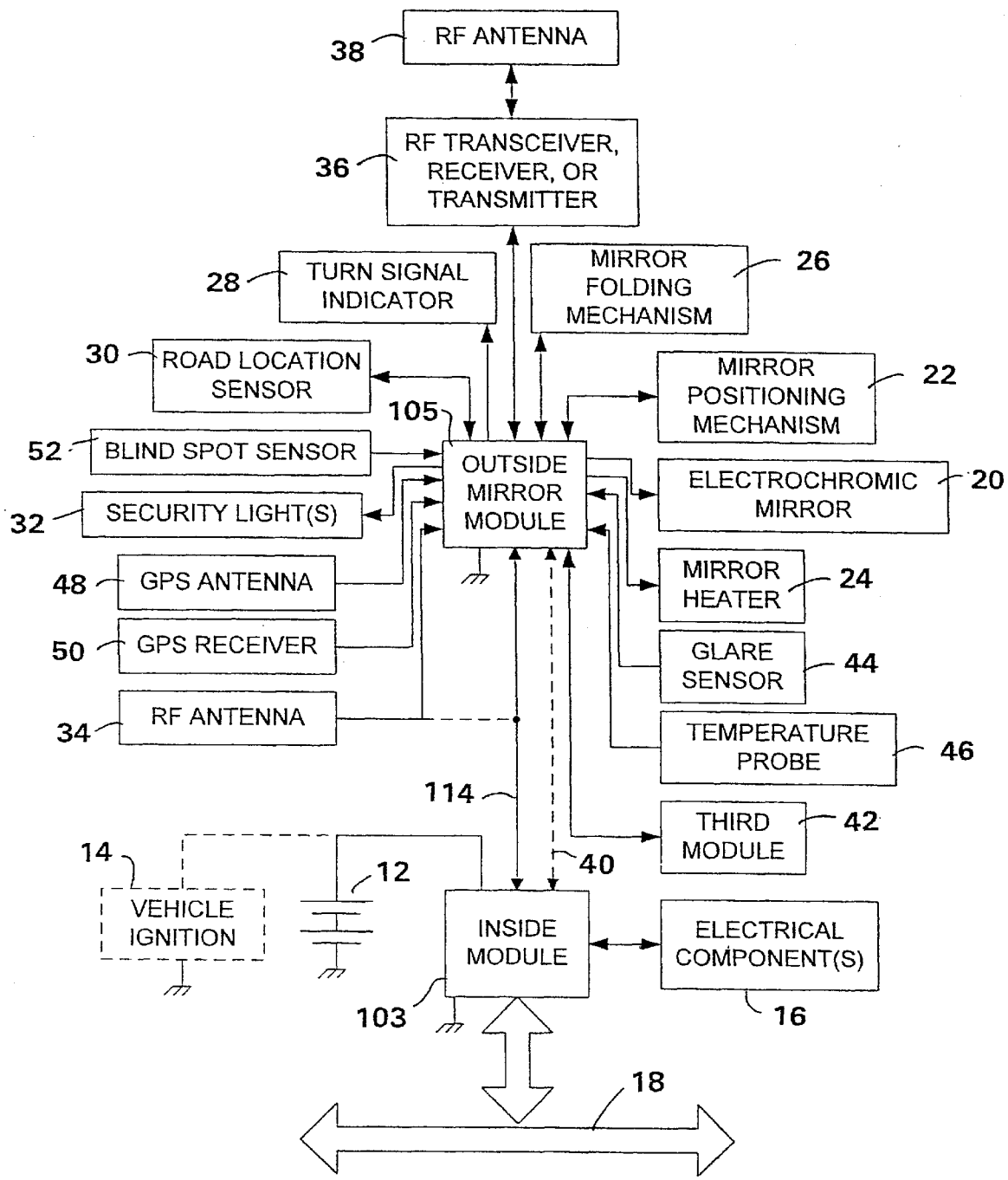
FIG. 2 is a block diagram illustrating an exemplary electronic module and electrical components as provided in an outside rearview mirror in accordance with the present invention.

FIG. 2 shows an example of how the present invention may be implemented to provide serial communication to an outside rearview mirror assembly including a plurality of different electrical components. As shown in FIG. 2, second module 105 may be an outside mirror module. Inside module 103 may be any electronic module located inside the vehicle, such as an inside rearview mirror module, a door module, an instrument panel module, or a roof module. Inside module 103 may receive power from the vehicle battery 12 or alternatively from vehicle ignition 14. Inside module 103 may be interfaced with one or more electrical components 16 depending upon where module 103 is located. For example, if inside module 103 is a door module, it would interface with door lock/unlock and window open/close switches and/or door lock and window actuators and optionally, seat movement switches, door open/close switches, a trunk release switch, a gas tank door release switch, mirror position switches, and heater switches. If inside module 103 is in inside rearview mirror module, it would interface with electrical components 16 such as an electrochromic mirror, an electronic compass, light sensors, a temperature sensor, a remote keyless entry (RKE) receiver, a GPS receiver, a tire pressure monitoring receiver, a garage door opener transmitter, etc. Inside module 103 may additionally be coupled to a vehicle system bus such as a CAN or J1850 bus.

Outside mirror module 105 is employed to control or otherwise convey command signals to a plurality of electrical components that are disposed within or on the housing of the outside rearview mirror assembly. Such electrical components may include any one or more of the following: an electrochromic mirror 20; a mirror positioning mechanism 22; a mirror heater 24; an automatic mirror folding mechanism 26; a turn signal indicator 28; a road/lane edge location sensor 30; one or more security lights 32; an RF antenna 34; an RF transceiver, receiver, or transmitter 36 having an antenna 38; a glare detection sensor 44; a temperature probe 46; a GPS antenna 48; a GPS receiver 50; and a blind spot detector 52.

Outside mirror module 105 is preferably coupled to inside module 103 by a single electrical conductor 114. Inside module 103 could then supply power, data, and RF signals to outside mirror module 105 over this single electrical conductor. Further, outside mirror module 105 could transmit data back to inside module 103 via conductor 114. Such data may include any RF signals received by antenna 34 (which may include tire pressure information, RKE commands, GPS data, etc.), data received by receiver 36, road/lane edge location sensor output signals, glare detection signals, blind spot detection signals, outside temperature, and/or any data transmitted from a third electronic module 42, which may be coupled to outside mirror module 105. Outside mirror module 105 need not be dependent upon inside module 103 for the supply of operating power. It is possible to provide a separate power line connection from module 105 directly to vehicle battery 12 or vehicle ignition 14. Alternatively, module 105 may receive its operating power from inside module 103 via a second electrical conductor 40. With such a configuration, modules 103 and 105 may communicate directly over conductor 114 without modulating the power that is supplied to outside mirror module 105.

Figure 3A:
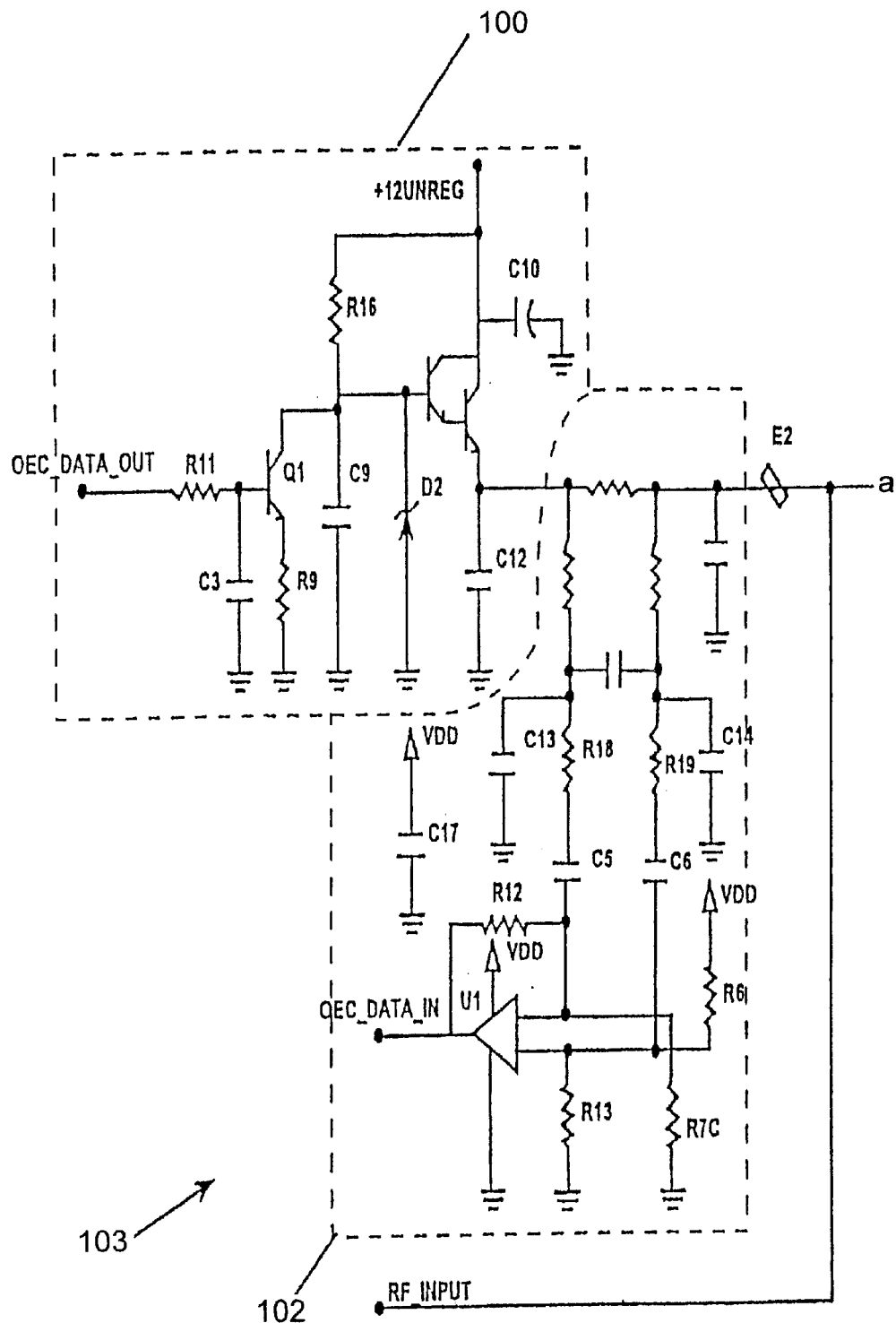
FIGS. 3a and 3b are a schematic diagram illustrating a vehicle communication system according to a particular embodiment of the present invention.
Figure 3B:
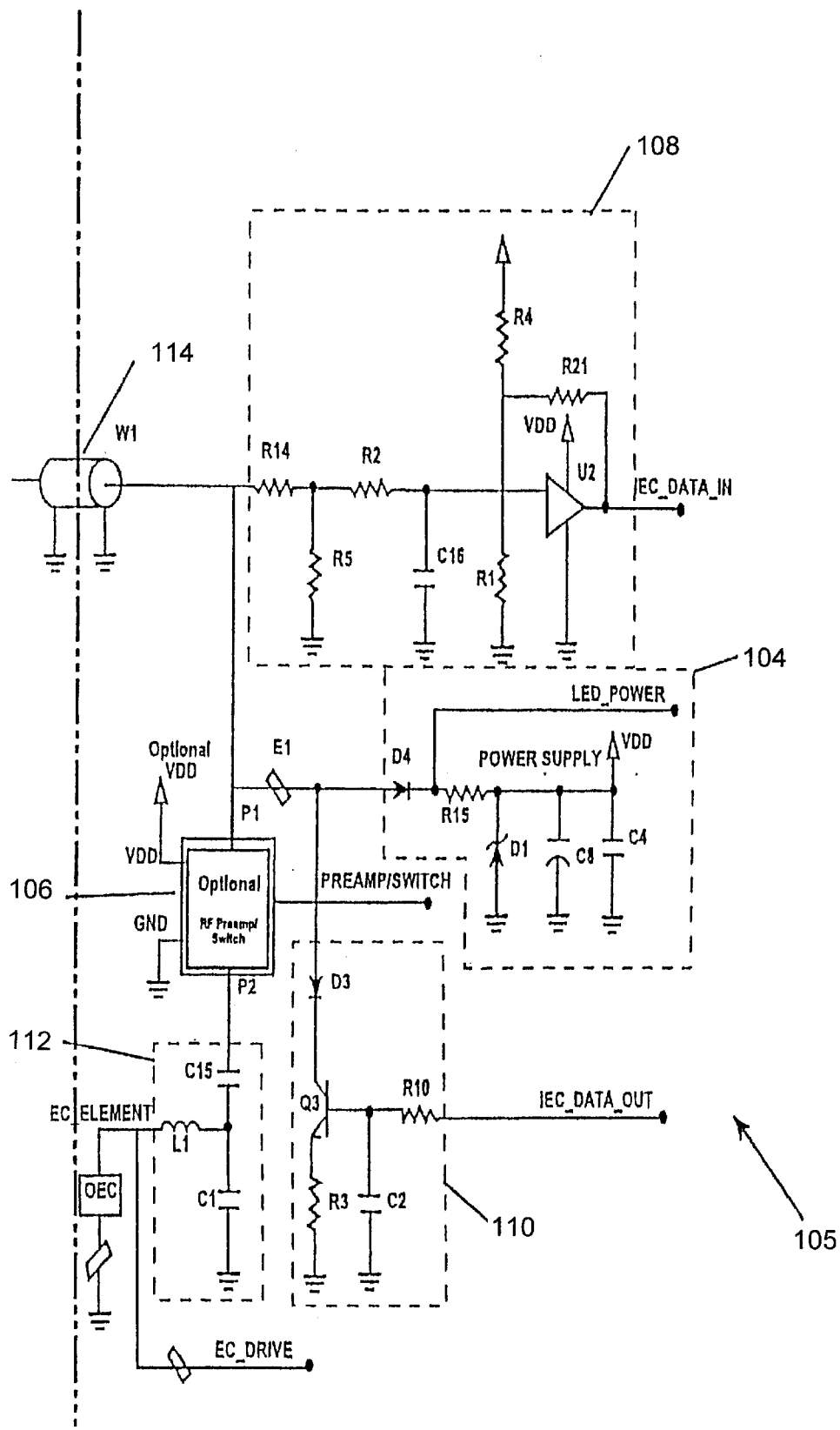

FIGS. 3a and 3b show a vehicle communication system comprising a first module 103 and a second module 105 connected by an interface 114 according to one embodiment of the present invention. More particularly for this embodiment, the first module 103 is located inside the vehicle and the second module 105 is located outside the vehicle as an outside mirror circuit with an electrochromic element. A power source 100 (FIG. 3a), associated with inside module 103 and which includes transistors Q1 and Q2, provides regulated power to the outside mirror circuit 105. Power is modulated when an input signal drives the OEC_DATA_OUT line between logic "HIGH" and "LOW" states.

In order to detect transmissions from the outside mirror circuit 105, a current sensing amplifier 102 in the first module 103 acts as a receiver for receiving data transmitted by the outside mirror circuit 105. This current sensing amplifier 102 includes a resistor R8, an operational amplifier U1, and associated circuitry. Ferrite beads E1, E2, and E3 or RF chokes in the power and data path isolate the RF signals from the rest of the circuitry and prevent signal loss. Current sensing amplifier 102 may also be used for diagnostic functions, such as determining whether there is a short or open circuit. It will also be appreciated by those skilled in the art that other ways of transmitting data may be used to transmit data from second module 105 back to first module 103. For example, second module 105 may use the voltage stored on a capacitor to vary the voltage appearing on conductor 114 and thereby communicate with first module 103.

In one implementation, a voltage regulator powers a microprocessor or other logic located in the outside mirror circuit 105. In the implementation depicted in FIG. 3b, diodes D1 and D4, resistor R15, and capacitors C8 and C4 form a voltage regulator 104 for this purpose. It will be appreciated, however, that certain types of loads do not require logic and can be operated directly from the point labeled LED_POWER. Examples of these types of loads include, for instance, exterior security lamps, turn indicators, and preamplifiers.

An optional preamplifier 106 in the outside mirror circuit 105 facilitates the use of relatively inexpensive twisted pair wiring for RF reception. If bi-directional RF transmission is desired, a switching diode or other switch can be used to bypass the preamplifier during transmissions from the first module 103 inside the vehicle. One example of an application that would benefit from this arrangement is a garage door opener transmitter located in an inside mirror combined with a remote keyless entry system.

In the outside mirror circuit 105, an operational amplifier U2 and its associated circuitry form a data comparator 108 used to detect power interruptions. This comparator 108 can be implemented using, for example, a microprocessor or a dedicated logic circuit. A resistor R3 and a transistor Q3 form a current source 110, which is used to transmit data from the outside mirror circuit 105 to the first module 103.

A DC blocking and matching network 112 formed by capacitors C15 and C1 and inductor L1 isolates the power and data signals from the electrochromic element. The capacitor C15 performs DC blocking and RF coupling. The inductor L1 and the capacitor C1 form an RF matching network to match the antenna, which is implemented here as the electrochromic element. It will be understood that other antenna structures, such as a one-quarter wave or helical structure, could be used in the outside mirror circuit 105 as well. While FIG. 3b depicts a particular topology for implementing the matching network 112, it will be appreciated by those skilled in the art that any of a variety of conventional matching network topologies can be used to implement the matching network 112. Topologies other than the one depicted in FIG. 3 may be appropriate in certain application environments, e.g., particular combinations of loss requirements, antennas, and transmission lines.

The first module 103 and the outside mirror circuit 105 are electrically connected using an interface 114. In the embodiment shown in FIGS. 3a and 3b, the interface 114 is implemented using a 50-ohm coaxial cable W1. It should be noted, however, that the interface 114 could be implemented using other alternative conductors, including, but not limited to, twisted pair, single wire with chassis ground, or other wiring. A line-of-sight optical connection capable of supplying power and data is also within the scope of an interface 114 for the invention.

Figure 4:
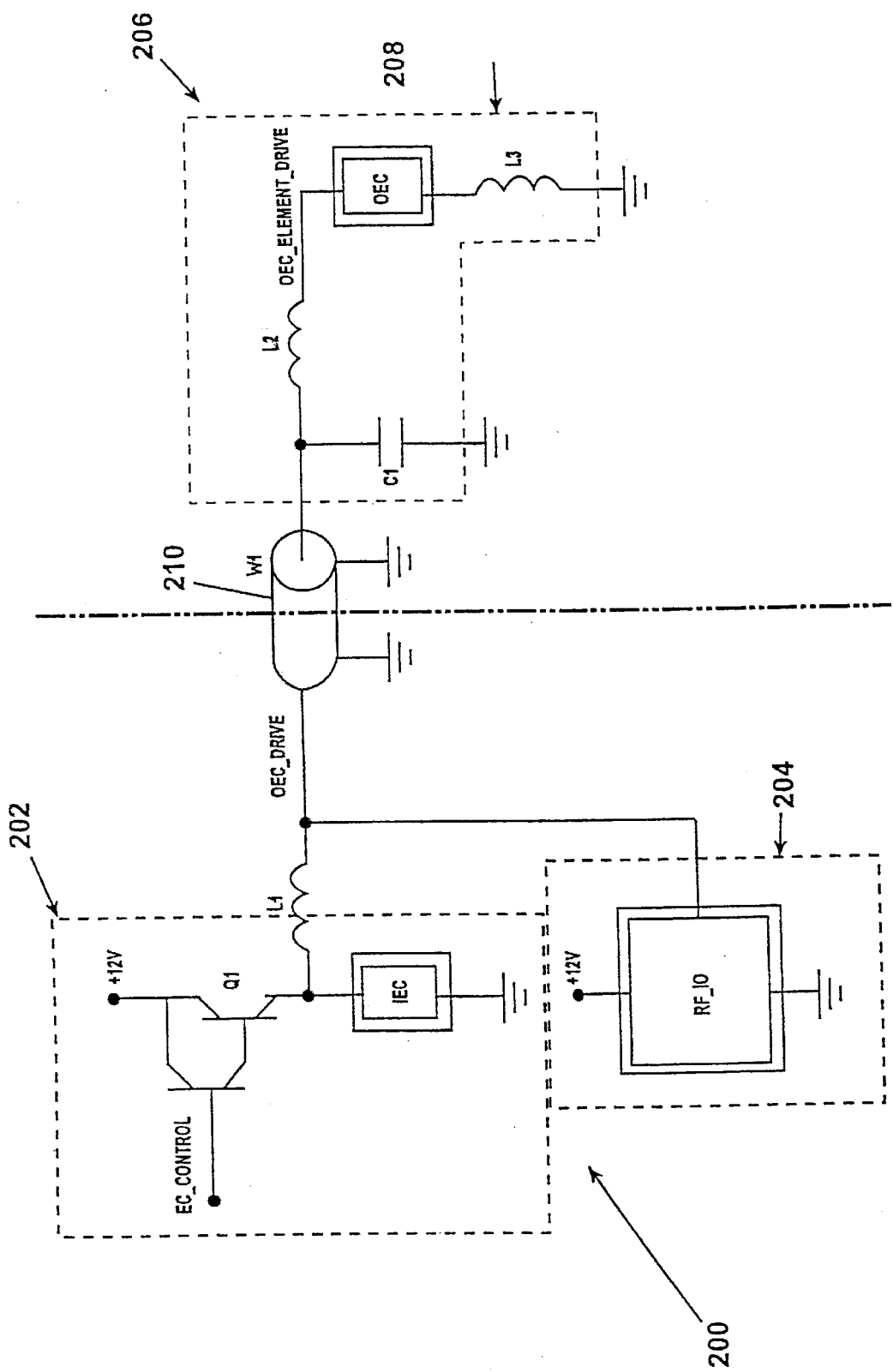
FIG. 4 is a schematic diagram illustrating a vehicle communication system according to a second embodiment of the present invention.

Another example circuit arrangement for implementing a vehicle communication system according to the invention is illustrated in FIG. 4. The arrangement of FIG. 4 is considerably simpler than the system shown in FIGS. 3a and 3b. In this embodiment, a first module 200 comprising a power source 202 and possibly including a transmitter, a receiver, or both 204, are located inside the vehicle, such as inside of the rearview mirror assembly. A second module 206, such as an outside mirror with an electrochromic element has, as its only circuitry, an optional matching network 208, which includes a capacitor C1 and inductors L2 and L3. The interface is the RF transmission line 210, which in this case is a coaxial cable W1. Electrochromic drive power is supplied to the electrochromic element using the RF transmission line 210. As with the embodiment depicted in FIGS. 3a and 3b, any of a variety of matching network topologies can be used to implement the matching network 208.

By using a single conductor 210 combined with a chassis ground to transmit data and power to and from the outside mirror module 206, the number of electrical wires is reduced, compared to that used with conventional electrochromic mirror systems. Further, using an outside mirror module as an antenna is particularly advantageous in vehicles in which a low-E metallic window coating shields RF transmission from the interior of the vehicle to the exterior. Moreover, vehicle security is enhanced because the vehicle bus is retained within the vehicle interior.

Figure 5:
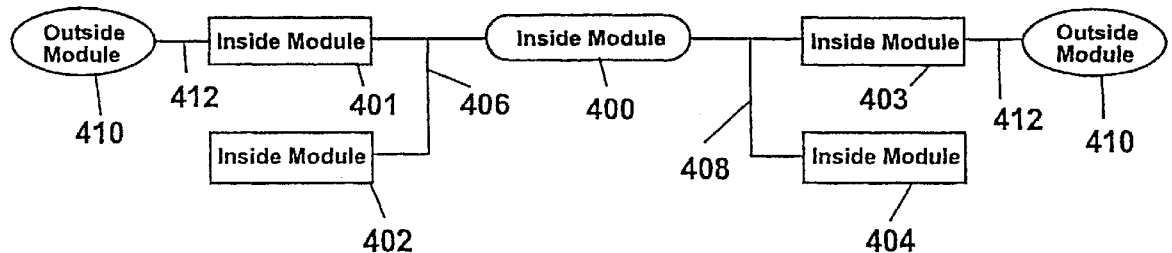
FIG. 5 is a block diagram illustrating a vehicle communication system according to a third embodiment of the present invention.

In FIG. 5, a further embodiment is illustrated where multiple inside modules 400–404, interior of the vehicle, are connected to each other by interfaces 406 and 408, and to a pair of outside modules 410, exterior of the vehicle, each by another interface 412. In a typical arrangement according to FIG. 5, the interfaces 406 and 408 can comprise the conventional vehicle bus such as CAN or J1857, and the interface 412 can be a coaxial cable or twisted wire pair.

Figure 6:
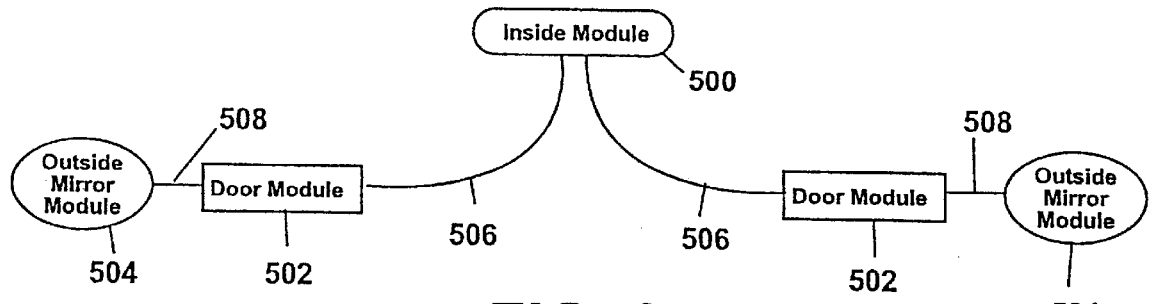
FIG. 6 is a block diagram illustrating a vehicle communication system according to a fourth embodiment of the present invention.

FIG. 6 illustrates a particular embodiment of the configurations of FIGS. 4 and 5. Here, an inside mirror module 500 is connected to a door module, such as a switch module 502 in both the driver's side and passenger side doors of an automobile, and then to an outside mirror module 504 exterior to each side of the vehicle. The interface 506 between the inside mirror module 500 and the door modules 502 might typically be a CAN bus and the interface 508 between each door module 502 and the corresponding outside mirror module 504 is a dedicated wire pair (power and ground). It may be that each door module 502 is separately powered, but is between the inside mirror module 500 or the door modules 502, and the outside mirror modules 504, at least some elements of the outside mirror modules are powered principally from an inside module. Thus, a typical arrangement might have the second module dependent upon the first module for power. Applying the principles of the invention, the inside mirror module or the door module will have circuitry to modulate the power delivered to the outside mirror modules, during which time the outside mirror modules can transmit data to the corresponding inside module over the dedicated wire pair 508.

Figure 7:
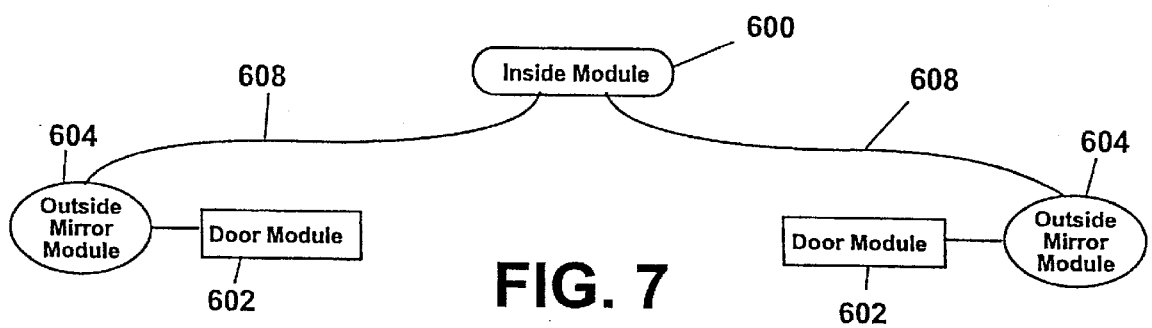
FIG. 7 is a block diagram illustrating a vehicle communication system according to a fifth embodiment of the present invention.

In FIG. 7, the arrangement is similar to FIG. 6, except that the inside mirror 600 is connected directly to the outside mirror modules 604 by an interface 608, and the door modules 602 are separately interfaced with the outside mirror modules for other functions. While the embodiment shown in FIG. 7 may appear to pose some added security risk by transmitting door unlock commands through outside mirror module 604, such an arrangement may nevertheless be desirable since it shortens the path for RF signals to travel when originating from inside module 600 relative to the embodiment shown in FIG. 6. Further, security measures may be added such as a rolling code algorithm that reduce the risks associated with running such transmission paths outside of the vehicle.

Figure 8:
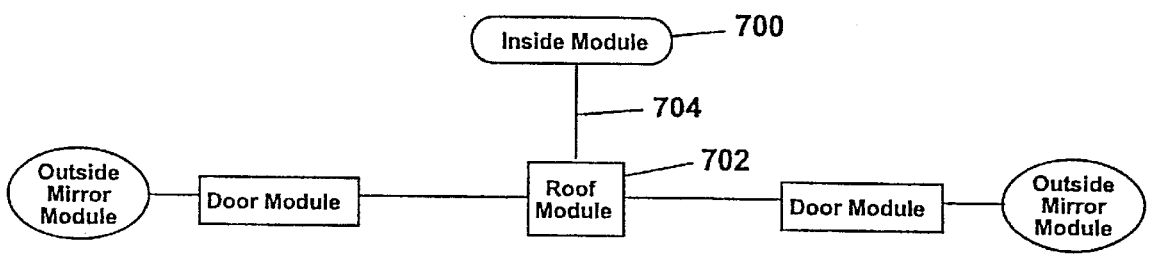
FIG. 8 is a block diagram illustrating a vehicle communication system according to a sixth embodiment of the present invention.

FIG. 8 shows an embodiment where the inside mirror 700 is also connected to a roof module 702 where, for example, RF antennas may be located for GPS tracking, radio transmission, cellular telephone transmission, etc. An interface 704 between them can utilize the benefits of the invention where data can be transmitted to and from the roof module while the RF power is modulated.

As will be readily apparent to those skilled in the art, the present invention significantly reduces the manufacturing and materials costs and the labor associated with running multiple discrete wires to an outside electrical module. By instead using one or two wires to transmit control signals to a plurality of different electrical components, a vehicle may be more easily upgraded. For example, multi-functional after-market outside rearview mirror assemblies could readily be installed on a vehicle using the communication system of the present invention since no additional wires would need to be run to provide control of the various additional functions provided in such a mirror assembly. Further, the ability to offer various options in an outside rearview mirror assembly is simplified since the wiring for each vehicle would be the same. In addition, the communication system of the present invention opens the door for additional advanced mirror functions in the future.

By avoiding the need to run the vehicle CAN or J1850 bus to the outside mirror assembly, multiple functions can be provided in an outside mirror assembly without introducing security risks or creating any added burden on the CAN or J1850 bus. The communication further improves self-diagnostics and the ability to test, trouble shoot, and repair the mirror assembly.

Another advantage to configuring an outside rearview mirror assembly in the inventive manner described above is that the printed circuit board (PCB), on which the mirror module and electrical component circuitry is mounted, generates more heat than the circuitry used in current commercially available mirror assemblies. This generated heat may be "dumped" to the mirror heater thereby reducing the number of heater wires in the heater element, which reduces the cost of the heater element and enables special glass technology requirements to be accommodated.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A communication circuit for use in a vehicle, comprising:
    a first electronic module adapted to be coupled to a power supply of the vehicle;
    a second electronic module disposed in a housing of an outside rearview mirror assembly; and
    a dedicated electrical conductor coupled between said first and second modules to provide a transmission path through which power may be supplied and through which bi-directional serial communication is enabled,
    wherein said first module supplies power to said second module through said dedicated electrical conductor and wherein said first and second modules transmit serial data to one another through said dedicated electrical conductor.

2. The vehicle communication circuit as defined in claim 1, wherein said first module modulates the power supplied to said second module by modulating the voltage level applied to said electrical conductor.

3. The vehicle communication circuit as defined in claim 1, wherein said first module modulates the power supplied to said second module by modulating the current delivered to said electrical conductor.

4. The vehicle communication circuit as defined in claim 1, wherein said second electronic module is disposed outside of the vehicle.

5. The vehicle communication circuit as defined in claim 1, wherein said first vehicle accessory is coupled to a vehicle system bus.

6. The vehicle communication circuit as defined in claim 1 and further including a third electronic module coupled to said second electronic module by a second dedicated electrical conductor.

7. The vehicle communication circuit as defined in claim 1, wherein said first module is disposed in a housing of an inside rearview mirror assembly.

8. The vehicle communication circuit as defined in claim 1, wherein said first module is disposed in a door of the vehicle.

9. The vehicle communication circuit as defined in claim 1 and further including a third electronic module coupled to said second electronic module by a second dedicated electrical conductor, wherein said third module is disposed in a door of the vehicle.

10. The vehicle communication circuit as defined in claim 1, wherein said first module is coupled to a vehicle system bus and generates and transmits control signals to said second module in response to information transmitted on the vehicle system bus.

11. The vehicle communication circuit as defined in claim 1, wherein said electrical conductor and said first and second modules are configured for simultaneous bi-directional communication between said first and second modules.

12. The vehicle communication circuit as defined in claim 1, wherein said first module modulates the power supplied to said second module with serial data.

13. The vehicle communication circuit as defined in claim 1, wherein at least one of said first and second modules transmit RF signals over said dedicated electrical conductor.

14. The vehicle communication circuit as defined in claim 13, wherein said electrical conductor is shielded to minimize electromagnetic interference.

15. The vehicle communication circuit as defined in claim 13, wherein at least one of said first and second modules includes a DC matching and blocking network.

16. The vehicle communication circuit as defined in claim 13, wherein said second module includes an antenna for receiving RF signals.

17. The vehicle communication circuit as defined in claim 13, wherein said second module includes an antenna for transmitting RF signals received through said electrical conductor.

18. The vehicle communication circuit as defined in claim 1, wherein said second module is dependent upon said first module for electrical power.

19. The vehicle communication circuit as defined in claim 1, wherein said first module modulates the power supplied between a first voltage level and a second voltage level, where the second voltage level is lower than the first voltage level and is greater than zero.

20. The vehicle communication circuit as defined in claim 1, wherein said first module generates and transmits control signals to said second module for control of independently operated electrical components coupled to said second module.

21. A communication circuit for use in a vehicle, comprising:
   a first electronic module adapted to be coupled to a power supply of the vehicle;
   a second electronic module disposed in a housing of an outside rearview mirror assembly; and
   a dedicated electrical conductor coupled between said first and second modules to provide a transmission path through which power may be supplied and through which serial communication is enabled,
   wherein said first module supplies power to said second module through said dedicated electrical conductor and wherein said first and second modules transmit serial data to one another through said dedicated electrical conductor, and wherein said second module is dependent upon said first module for electrical power.

22. The vehicle communication circuit as defined in claim 21, wherein at least one of said first and second modules transmit RF signals over said electrical conductor.

23. A communication circuit for a vehicle, comprising:
   an RF antenna disposed outside of the vehicle;
   a first electronic module disposed inside the vehicle and coupled to a power supply of the vehicle;
   a second electronic module coupled to said RF antenna; and
   a dedicated electrical conductor coupled between said first and second modules to provide a transmission path through which power and RF signals may be transmitted,
   wherein said first module supplies power to said second module through said dedicated electrical conductor and wherein at least one of said first and second modules transmits RF signals to the other module through said dedicated electrical conductor.

24. The vehicle communication circuit as defined in claim 23, wherein said antenna receives RF signals and said second module transmits the received RF signals to said first module through said dedicated electrical conductor.

25. The vehicle communication circuit as defined in claim 23, wherein said first module is coupled to a receiver of a tire pressure sensing system, said antenna receives RF signals indicating a sensed tire pressure and transmits the received RF signals to the receiver through said first and second modules and said electrical conductor.

26. The vehicle communication circuit as defined in claim 23, wherein said antenna is disposed in a housing of an outside rearview mirror assembly.

27. The vehicle communication circuit as defined in claim 23, wherein said electrical conductor is shielded to minimize electromagnetic interference.

28. The vehicle communication circuit as defined in claim 23, wherein at least one of said first and second modules includes a DC matching and blocking network.

29. The vehicle communication circuit as defined in claim 23, wherein said first module is coupled to a receiver of a remote keyless entry system, said antenna receives RF signals including a command to lock/unlock one or more vehicle doors and transmits the received RF signals to the receiver through said first and second modules and said electrical conductor.

30. The vehicle communication circuit as defined in claim 23, wherein said first module is coupled to a receiver of a trainable RF transmitter, said antenna receives RF signals including a command to open one or more garage doors and transmits the received RF signals to the receiver through said first and second modules and said electrical conductor during training of the trainable RF transmitter.

31. The vehicle communication circuit as defined in claim 23, wherein said first module is coupled to a GPS receiver, said antenna receives RF signals from a GPS satellite and transmits the received RF signals to the receiver through said first and second modules and said electrical conductor.

32. The vehicle communication circuit as defined in claim 23, wherein said first module is coupled to a garage door opening transmitter that transmits RF signals to said antenna through said first and second modules and said electrical conductor.

33. The vehicle communication circuit as defined in claim 23, wherein said first module is coupled to a transceiver that transmits/receives RF signals to/from said antenna through said first and second modules and said electrical conductor.

34. The vehicle communication circuit as defined in claim 23, wherein said dedicated electrical conductor provides a transmission path through which bi-directional serial communication is enabled, and said first and second modules transmit serial data to one another through said dedicated electrical conductor.

35. The vehicle communication circuit as defined in claim 23, wherein said second electronic module is disposed outside of the vehicle.

36. The vehicle communication circuit as defined in claim 23, wherein said second electronic module is disposed inside of the vehicle.

37. The vehicle communication circuit as defined in claim 23, wherein said first vehicle accessory is coupled to a vehicle system bus.

38. The vehicle communication circuit as defined in claim 23, wherein said first module is disposed in a housing of an inside rearview mirror assembly.

39. The vehicle communication circuit as defined in claim 23, wherein said first module is disposed in a door of the vehicle.

40. The vehicle communication circuit as defined in claim 23, wherein said second module is disposed in a housing of an outside rearview mirror assembly.

41. An outside rearview mirror assembly for a vehicle comprising:
a housing; and
at least two electrical components disposed within or on said housing, said electrical components are coupled to a dedicated electrical conductor that provides a transmission path through which power and serial data signals may be collectively transmitted to said electrical components, said electrical components are independently controlled as a result of the transmittal of selected serial data signals transmitted through said transmission path.

42. The outside rearview mirror assembly as defined in claim 41 and further including a control circuit disposed within or on said housing and coupled to said electrical components and to said electrical conductor such that said electrical components are coupled to the electrical conductor through said control circuit, said control circuit transmits control signals to said electrical components in response to serial data signals transmitted through said transmission path such that said electrical components being independently controlled as a result of the transmittal of selected serial data signals transmitted through said transmission path.

43. The outside rearview mirror assembly as defined in claim 42, wherein said electronic controller receives power from a power supply through said transmission path and wherein the power supplied through the transmission path is modulated with the data signals.

44. The outside rearview mirror assembly as defined in claim 43, wherein said control circuit supplies power to at least one of said electrical components.

45. The outside rearview mirror assembly as defined in claim 42, wherein said control circuit is coupled to a second electrical conductor through which said control circuit receives power.

46. The outside rearview mirror assembly as defined in claim 45, wherein said control circuit supplies power to said electrical components.

47. The outside rearview mirror assembly as defined in claim 41, wherein said electrical components include any two or more of the following components: an electrochromic mirror, a glare detection sensor, a turn signal indicator, an exterior security lamp, a mirror heater, an RF antenna, an RF receiver, an RF transmitter, a mirror positioning mechanism, a mirror folding mechanism, a temperature probe, a GPS antenna, a GPS receiver, a blind spot detector, and a road/lane edge sensor.

48. An inside rearview mirror assembly for a vehicle comprising:
a housing; and
a control circuit disposed within or on said housing and coupled to a dedicated electrical conductor that provides a transmission path through which power and serial data signals may be transmitted to at least two independently operable electrical components of the vehicle that are coupled to the dedicated electrical conductor, said control circuit serially transmits data signals through said transmission path to control the operation of the electrical components.

49. The inside rearview mirror assembly as defined in claim 48, wherein said control circuit receives signals from at least one of the electrical components through said electrical conductor.

50. The inside rearview mirror assembly as defined in claim 48, wherein the electrical components to which said control circuit is coupled include any two or more of the following components: an electrochromic mirror, a glare detection sensor, a turn signal indicator, an exterior security lamp, a mirror heater, an RF antenna, an RF receiver, an RF transmitter, a mirror positioning mechanism, a mirror folding mechanism, a temperature probe, a GPS antenna, a GPS receiver, a blind spot detector, and a road/lane edge sensor.

51. The inside rearview mirror assembly as defined in claim 48, wherein the electrical components to which said control circuit is coupled include any two or more of the following components: window switches, mirror position switches, heater switches, door open/close switches, seat movement switches, a trunk release switch, and a gas tank door release switch.

52. The inside rearview mirror assembly as defined in claim 48, wherein said control circuit is coupled to a vehicle system bus.

53. The inside rearview mirror assembly as defined in claim 48 and further including an RF receiver disposed in said mirror housing and coupled to said control circuit to receive RF signals through the electrical conductor.

54. The inside rearview mirror assembly as defined in claim 48 and further including an electrochromic mirror disposed in said housing and electrically coupled to said control circuit.

55. The inside rearview mirror assembly as defined in claim 48, wherein said control circuit supplies power to the electrical components.

56. The inside rearview mirror assembly as defined in claim 55, wherein said control circuit supplies power to the electrical components through a second electrical conductor.

57. The inside rearview mirror assembly as defined in claim 55, wherein said control circuit supplies power through said electrical conductor and modulates the supplied power with serial data.

58. An electronic door module assembly for a vehicle comprising a control circuit disposed in a door of the vehicle and coupled to a dedicated electrical conductor that provides a transmission path through which serial data signals may be transmitted to at least two independently operable electrical components of the vehicle that are coupled to the electrical conductor, said control circuit serially transmits data signals through said transmission path to control the operation of the electrical components, wherein the electrical components to which said control circuit is coupled include any two or more of the following components: an electrochromic mirror, a glare detection sensor, a turn signal indicator, an exterior security lamp, a mirror heater, an RF antenna, an RF receiver, an RF transmitter, a mirror positioning mechanism, a mirror folding mechanism, a temperature probe, a GPS antenna, a GPS receiver, a blind spot detector, and a road/lane edge sensor.

59. An electronic door module assembly for a vehicle comprising a control circuit disposed in a door of the vehicle and coupled to a dedicated electrical conductor that provides a transmission path through which serial data signals may be transmitted to at least two independently operable electrical components of the vehicle that are coupled to the electrical conductor, said control circuit serially transmits data signals through said transmission path to control the operation of the electrical components, wherein said control circuit is coupled to any two or more of the following components: window switches, mirror position switches, heater switches, door open/close switches, seat movement switches, a trunk release switch, and a gas tank door release switch.

* * * * *